United States Patent [19]

Morimoto et al.

[11] Patent Number: 5,150,990
[45] Date of Patent: Sep. 29, 1992

[54] HIGH DENSITY PNEUMATIC TRANSPORT SYSTEM FOR USE WITH SOLID MATERIALS

[75] Inventors: Kiyoshi Morimoto; Akikazu Iwamoto; Masahiko Shimizu; Teiichi Miwa, all of Shizuoka; Kazue Murata, Nara, all of Japan

[73] Assignee: Kabushiki Kaisha Matsui Seisakusho, Osaka, Japan

[21] Appl. No.: 606,094

[22] Filed: Oct. 31, 1990

[30] Foreign Application Priority Data

Nov. 8, 1989 [JP] Japan .................. 1-290882

[51] Int. Cl.⁵ ............................. B65G 53/66
[52] U.S. Cl. ........................ 406/50; 406/24; 406/25; 406/32; 406/195
[58] Field of Search ............ 406/23, 24, 25, 32, 406/50, 128, 130, 195

[56] References Cited

U.S. PATENT DOCUMENTS

| | | | |
|---|---|---|---|
| 4,019,783 | 4/1977 | Kayser | 406/130 X |
| 4,106,817 | 8/1978 | Tsuzuku et al. | 406/49 |
| 4,355,929 | 10/1982 | Snowdon | 406/130 X |
| 4,573,800 | 3/1986 | Lasso et al. | 406/128 X |
| 4,699,548 | 10/1987 | Bergstrom | 406/130 X |

FOREIGN PATENT DOCUMENTS

| | | | |
|---|---|---|---|
| 268101 | 5/1988 | European Pat. Off. | 406/195 |
| 269250 | 6/1988 | European Pat. Off. | 406/50 |
| 296803 | 12/1988 | European Pat. Off. | 406/195 |
| 280125 | 12/1987 | Japan | 406/50 |
| 106230 | 5/1988 | Japan | 406/195 |
| 106231 | 5/1988 | Japan | 406/195 |
| 2930 | 1/1989 | Japan | 406/50 |
| 89/09173 | 10/1989 | World Int. Prop. O. | 406/195 |

Primary Examiner—Margaret A. Focarino
Assistant Examiner—Gary C. Hoge
Attorney, Agent, or Firm—Jones, Tullar & Cooper

[57] ABSTRACT

A high density pneumatic transport system of solid materials from an airtight transport tank through a transport pipe into a collector. In the airtight transport tank materials are successively fed into a charge tank by reciprocating a slide damper. Simultaneously materials stored in the charge tank are successively pushed out into the transport pipe by supplying pressurized gas intermittently and transported continuously at high density through a lower horizontal pipe and a vertical riser pipe, then transported in the form of a long column in an upper horizontal pipe at a very low speed by deceleration by a divergent means, and finally collected into a storage tank of the collector.

2 Claims, 9 Drawing Sheets

HIGH DENSITY PNEUMATIC TRANSPORT SYSTEM FOR USE WITH SOLID MATERIALS

BACKGROUND OF THE INVENTION

1. Field of the Invention

This invention relates to a high density pneumatic transport system for use in solid materials with which solid materials continuously supplied from a tablet molding machine are transported through a transport pipe into a collector by the use of pressurized gas. Herein solid materials denote solids having regular shape regardless of figure and size of the grain thereof a such as medical tablets and confectionery.

2. Prior Art

U.S. Pat. Nos. 4,856,941 and 4,904,128 disclose a system to execute a method in which powdered or granular materials including solids such as medical tablets can be pneumatically transported in a transport pipe.

In U.S. Pat. No. 4,856,941, when powdered or granular materials stored in an airtight transport tank are taken out to a transport pipe, a transport plug of particular shape is inserted to section the materials and the plug transports the sectioned materials through the pipe at a low speed. In U.S. Pat. No. 4,904,128, a transport pipe is constructed with a plurality of reducers and powdered or granular materials taken out from an airtight transport tank are transported at high density in a lower section and a vertical section of pipe and at a low speed in the form of a long column in the upper horizontal section of pipe without using a transport plug. Both inventions represent new and ideal proposals in which powdered or granular materials can be transported at high density and at a low speed in a transport pipe without causing any chips or cracks.

However, in U.S. Pat. No. 4,856,941, a problem exists with controlling operations in which a transport plug is to be inserted prior to intermittent supply of pressurized transport gas and the inserted plug is to be removed after completing transportation of powdered or granular materials. Also in U.S. Pat. No. 4,904,128, a large capacity airtight transport tank is required for storing powdered or granular materials to be transported, resulting in a large overall. There have also been problems in that the supply pressure of pressurized transport gas has to be sensitively adjusted and moreover the adjustment of the transport gas pressure when the transferring of materials starts has also been troublesome.

These systems requires a large airtight transport tank and have a batch transportation method applied in which powdered or granular materials stored in the airtight transport tank can be continuously supplied into the transport pipe until the tank becomes empty, the transportation of materials is stopped while the tank is empty and the transportation is started again after materials are supplied and stored in the tank. When the transportation of materials is stopped halfway, a blowout phenomenon occurs because of blowing of pressurized gas accumulated in the tank. Solutions for such a blowout problem have been desired.

SUMMARY OF THE INVENTION

To solve the above-mentioned problems a new system is proposed in which an airtight transport tank can be made smaller and materials can be transported successively.

Accordingly, the present invention solves the above-mentioned problems and a first object is to provide a high density pneumatic transport system which can make an airtight transport tank smaller and can transport powdered or granular materials at high density, at a low speed, uniformly, and without having any impact.

A second object is to provide a high density pneumatic transport system which is free from the blowout problem which causes residual pressure in an airtight tank to give impact on solid materials when transportation of materials is stopped in the course of transferring.

And a third object is to provide a high density pneumatic transport system having high transporting efficiency which can facilitate pressure adjustments of the transport gas, supply solid materials into an airtight transport tank without interruption, and execute a pneumatic transportation continuously.

A system according to the present invention to achieve the above-mentioned objects comprises an airtight transport tank in which solid materials continuously manufactured and supplied from a compression molding machine are stored in a charge tank thereof, a material transport pipe connected with an outlet of the charge tank of the airtight transport tank, and a collector connected at the end of the transport pipe. Solid materials transferred from a material chamber into the charge tank by opening a slide damper of the airtight transport tank are fed into the transport pipe by supplying pressurized gas intermittently into the charge tank like an inching operation while the slide damper of the airtight tank is closed, transported continuously at high density in a lower horizontal pipe and a vertical pipe and at a very low speed forming like a long column in an upper horizontal pipe of transport pipe, and finally collected into the collector under substantially gravitational fall.

The airtight transport tank comprises the material storage chamber for storing solid materials such as medical tablets continuously manufactured and supplied from the molding machine, and the slide damper to drop and transfer the materials stored in the storage chamber into the charge tank. The materials are fed into the transport pipe by supplying pressurized gas intermittently into the charge tank. Pressurized air is generally used as a pressurized gas, but an inert gas such as nitrogen gas is used for materials for which oxidation is not desirable.

The material transport pipe is constructed such that the lower horizontal pipe has a convergent reducer and is connected to the upper horizontal pipe having a divergent reducer at the upstream end thereof interposed by a vertical riser pipe having a pair of divergent and convergent reducers arranged vertically in the direction of material transportation, whereby materials are continuously pushed forward at high density in the lower horizontal pipe, decelerated by the reducer of upper horizontal pipe and transported in the form of a long column at a low speed.

The airtight transport tank is constructed so as to prevent solid materials from being pinched by a control cover when the slide damper opens or closes. For those purposes an inclined guide plate having a vertical portion the upper end of which is tapered and closed is provided above the control cover of the slide damper with a space at the bottom thereof, a vertical partition is provided below the cover with spaces at the top and bottom thereof. The spaces formed under the inclined guide plate and over the vertical partition are formed large enough to allow solid materials to pass therethrough. The transport plug is used so as to transport residual materials in the pipe. For this purpose the plug housing portion to keep the transport plug is further provided below the charge tank.

Functions of the present system will now be described.

When the slide damper of the airtight transport tank is opened, solid materials continuously supplied from the compression molding machine and stored in the material storage chamber are inserted into the charge tank. The materials thus contained in the charge tank are successively pushed into the transport pipe by supplying pressurized gas intermittently into the charge tank like an inching operation with the tank kept at high density by closing the slide damper. Then the materials are transported continuously at high density in the lower pipe and a vertical pipe and at a very low speed in the form of a long column in the upper horizontal pipe of the transport pipe, and finally collected into the collector provided at the end of the pipe under substantially gravitational fall.

According to the present system, when the slide damper of the airtight tank is closed, solid materials continuously supplied from the compression molding machine are stored in the material storage chamber to prepare for the next pneumatic transportation. In the manner as described above, materials are contained also in the charge tank, inserted into the transport pipe and pneumatically transported through the pipe. In this way, materials can be transported without stopping material supply of the airtight transport tank.

Further according to the present system, it is preferable that inserted solid materials are not pinched by the control cover when the damper of the airtight transport tank opens and closes. The airtight transport tank of the present invention can perfectly prevent materials from being pinched by the cover during opening and closing operations of the slide damper and also can execute pneumatic transportation efficiently while receiving solid materials smoothly without causing damage to the materials.

DETAILED DESCRIPTION OF THE PREFERRED EMBODIMENT

One preferable embodiment according to the present invention will be described in conjunction with the attached drawings.

Medical tablets continuously manufactured at a tablet molding machine 1 are discharged from a take-out pipe 1a projecting out of the front of the molding machine 1, fed to a powder eliminator 2 so as to eliminate their powder and dust, then successively supplied into an airtight transport tank 3 through a discharge pipe 2a. In the airtight tank 3 opening and closing operations of a slide damper 3A and intermittent supply of pressurized gas are repeatedly executed in order to send the supplied solid materials into a transport pipe 4 as described hereinafter.

Figure 8:
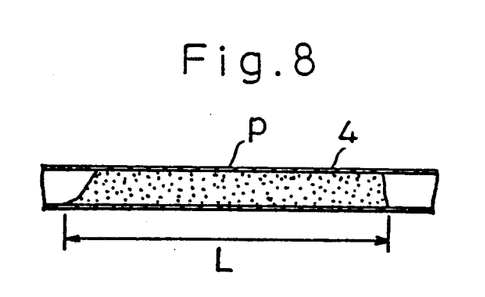
FIG. 8 illustrates a column of solid materials formed by the present invention.

As a result of these control operations, the solid materials stored in a charge tank 30 of the airtight transport tank 3 are successively pushed into the transport pipe 4, then transported upwardly in a vertical riser pipe 42 while charged to a degree just before blocking by a convergent reducer 41a provided at a lower horizontal pipe 41, and finally transferred into an upper horizontal pipe 43. In the upper horizontal pipe 43, materials thus transported are decelerated by a divergent reducer 43a provided at the upstream end of the pipe 43 and formed into a long column P as shown in FIG. 8. Then those materials are transported at a very low speed and finally collected into a collector 8 under substantially gravitational fall.

The construction of the present system will now be described.

Figure 2:
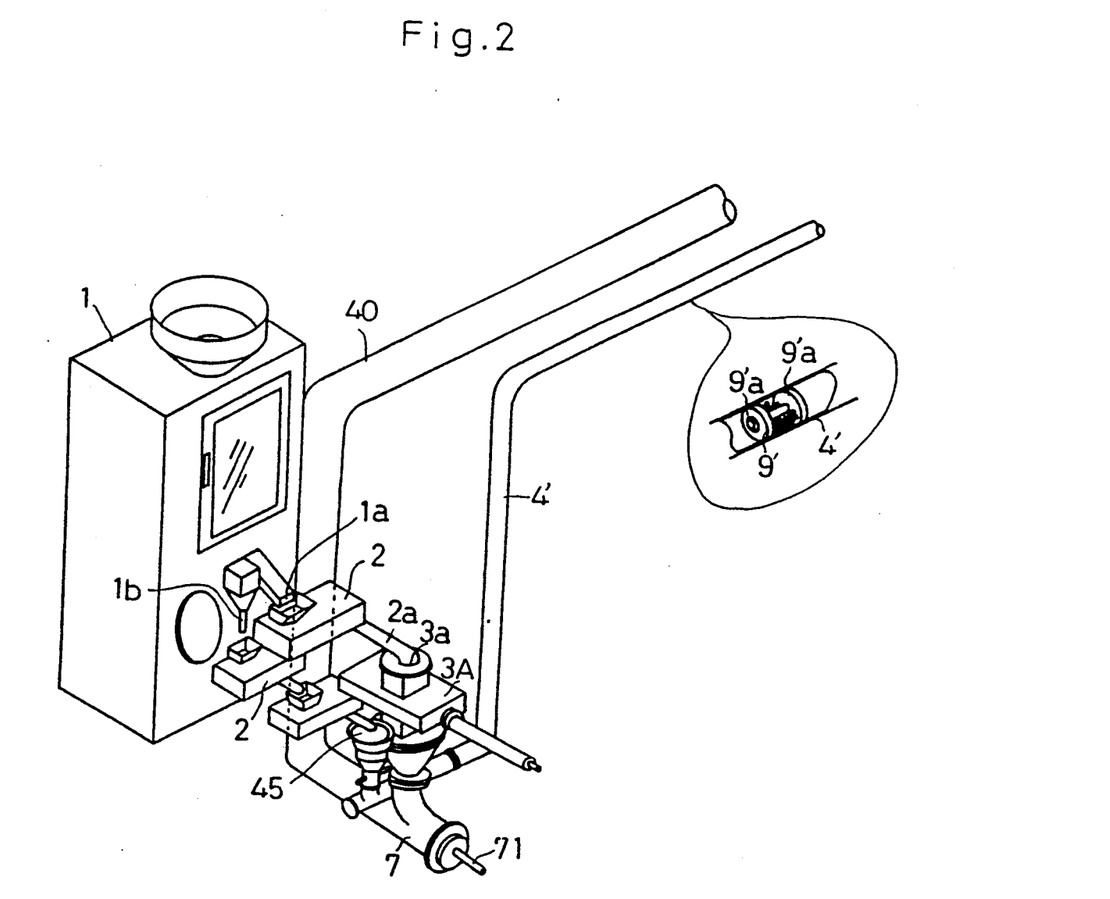
FIG. 2 illustrates one preferable embodiment when the system of the present invention is applied to a transportation of tablets continuously supplied from a tablet molding machine.

The tablet molding machine 1, as shown in FIG. 2, is provided with the material take-out pipe 1a to discharge medical tablets continuously manufactured therein and a sample supply pipe 1b to take out a sample of manufactured tablets periodically at fixed intervals (as per a manufacturing lot), both pipes projecting out of the front of the machine 1. After the tablets discharged from the take-out pipe 1a and the sample supply pipe 1b have their extra powder removed at the powder eliminators 2 and 2 respectively, they are supplied into a material receiving port 3a of the airtight transport tank 3 and a sample receiving port 45 provided at the end of another transport pipe 4' respectively. In FIG. 2 the material transport pipe 4 is covered with a covering pipe 40 having the same caliber throughout the pipe. The tablets supplied into the sample receiving port 45 are transferred into an inspecting station (not illustrated) while kept between bodies 9'a and 9'a of transport plug 9' (as shown in a partially enlarged view) in order to check the quality of the manufactured tablets by inspecting grain size, weight of tablets and so on.

Figure 1:
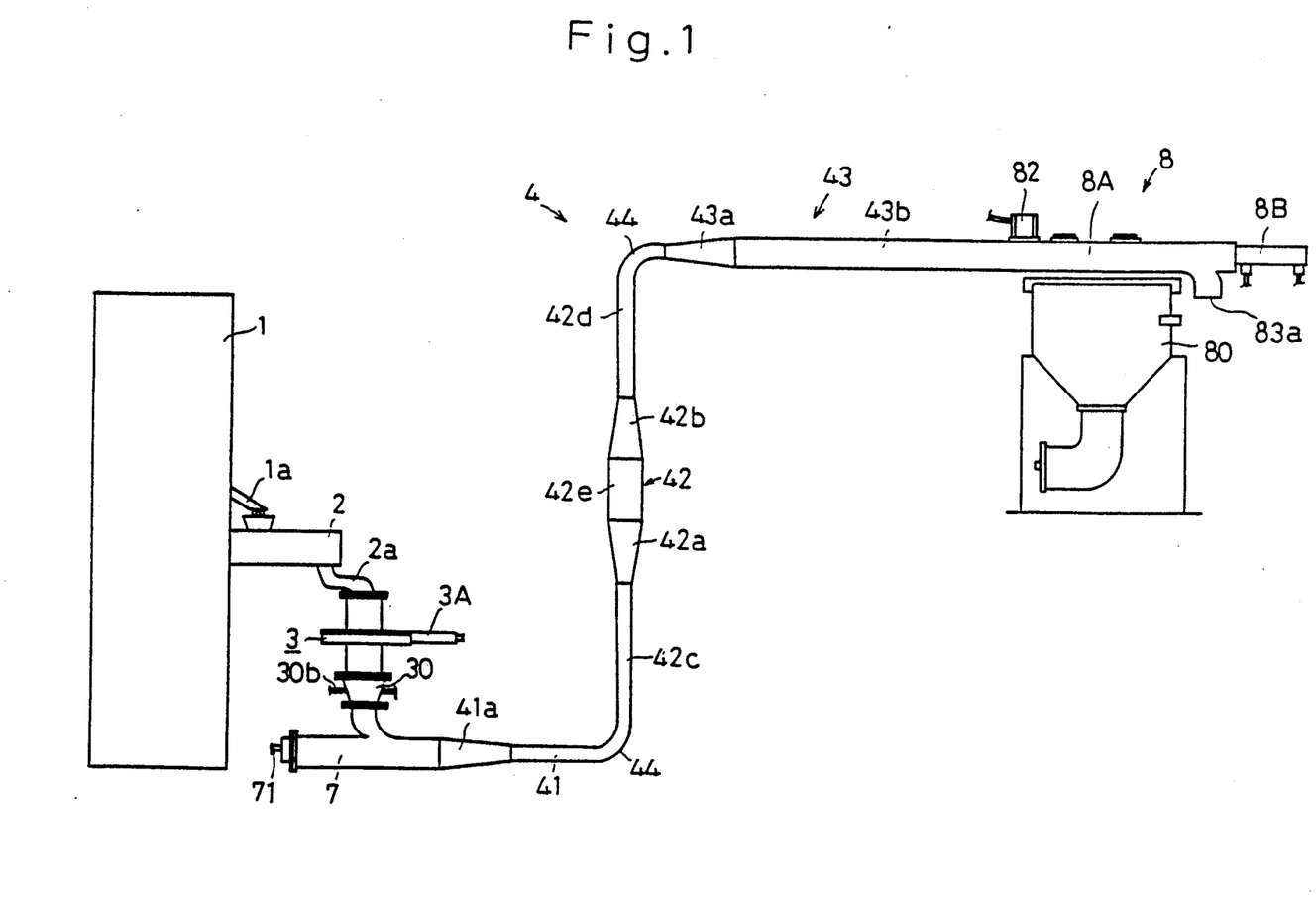
FIG. 1 is a block diagram of a system according to the present invention.

The transport pipe 4 is constructed such that the lower horizontal pipe 41 having the convergent reducer 41a is connected with a discharge port provided under the charge tank 30 of the airtight transport tank 3; the end of the lower pipe 41 is connected through a bend pipe 44 to the vertical riser pipe 42 having straight pipes 42c and 42d and a pair of divergent and convergent reducers 42a and 42b vertically arranged in the direction of material transportation between the two straight pipes 42c and 42d. Further, the end of the vertical pipe 42 is connected to the upper horizontal pipe 43 composed of a straight pipe 43b and the divergent reducer 43a at the upstream end thereof. In this embodiment reducers of the same size are used for divergent and convergent reducers 41a, 42a, 42b and 43a constructing the transport pipe 4. In FIG. 1, a numeral 42e indicates a sight glass provided so as to see the transporting conditions of the solid materials in the pipe 4.

Such a transport pipe 4 is described in U.S. Pat. No. 4,904,128, wherein solid materials intermittently pushed out of an airtight transport tank can be transported in an upper horizontal pipe at a low speed in the form of long column P as shown in FIG. 8 without using a transport plug.

Figure 7:
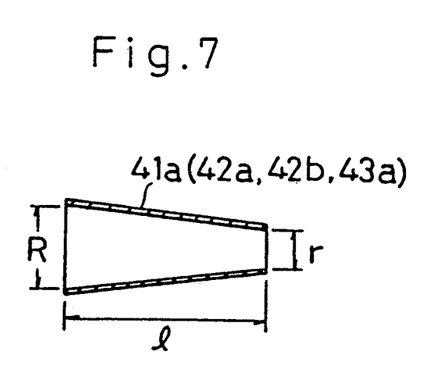
FIG. 7 is a vertical sectional view of a reducer used for a transport pipe.

As shown in FIG. 7, it is preferable to use a reducer is which the opening R is about 1.5 times as large as the smaller opening r thereof and of which the length 1 is from 4 to 20 times as long as the smaller opening r thereof as convergent reducers and divergent reducers used for the transport pipe 4. According to an experiment, a reducer with an opening R of 37.5 mm, r of 25 mm and a length from 250 to 500 mm could lead to good results.

The airtight transport tank 3 is constructed such that material storage chambers 31 and 32 having the airtight slide damper 3A therebetween are provided on the charge tank 30 to store solid materials.

Figure 3:
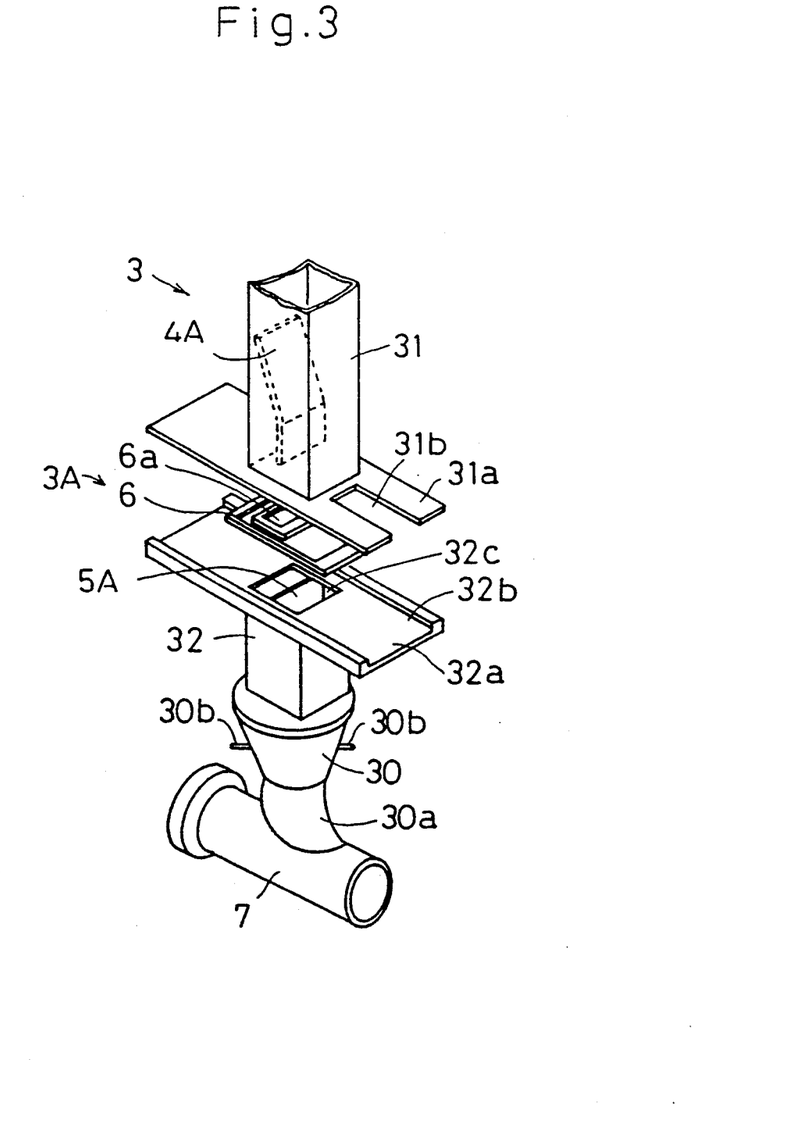
FIG. 3 is an exploded perspective diagram illustrating details of the airtight transport tank.
Figure 4:
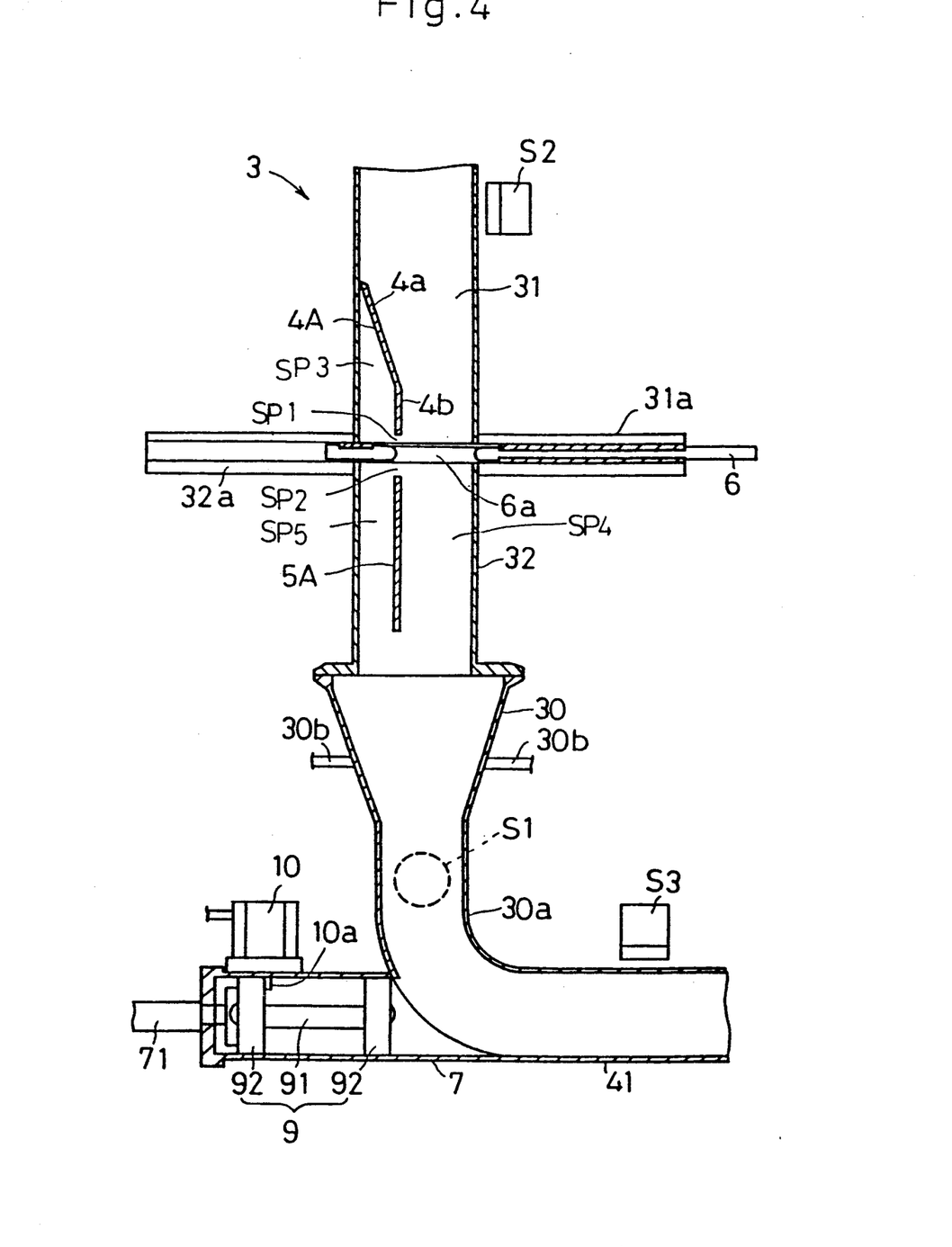
FIG. 4 is a vertical sectional view of an airtight transport tank, FIGS. 5 (a) to 5 (d) illustrate operation of the slide damper of the airtight transport tank.
Figure 5A:
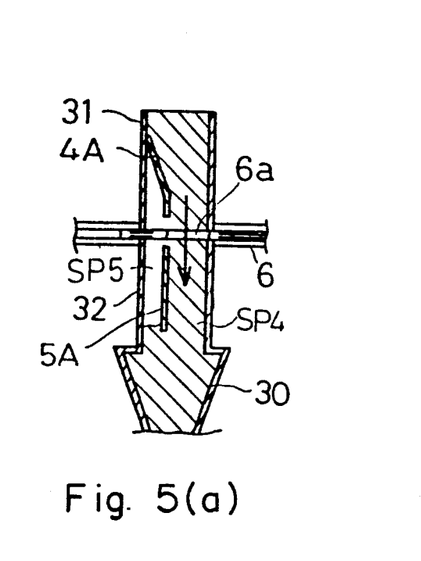
Figure 5B:
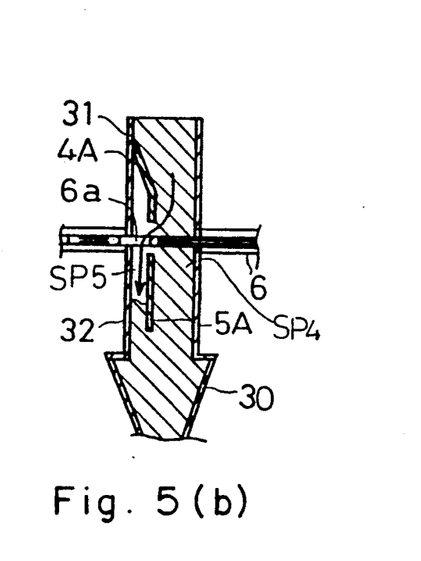
Figure 5C:
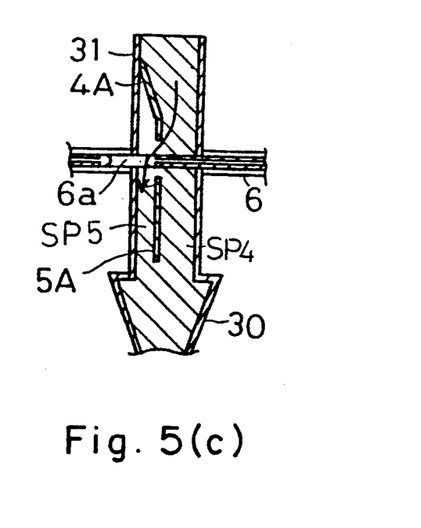
Figure 5D:
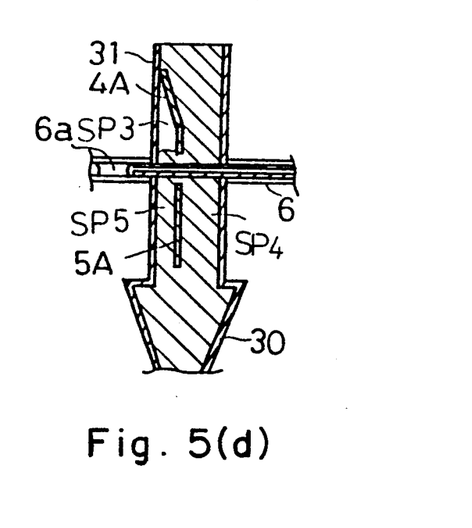

As shown in FIGS. 3 and 4, the airtight transport tank 3 is constructed such that an elbow-like material discharge pipe 30a provided downward projects out of a transport plug housing portion 7 described hereinafter and connected with the transport pipe 4, and the material storage chambers 31 and 32 having the slide damper mechanism 3A therebetween are provided above the charge tank 30 having pressurized gas introduction pipes 30b and 30b.

Figure 12:
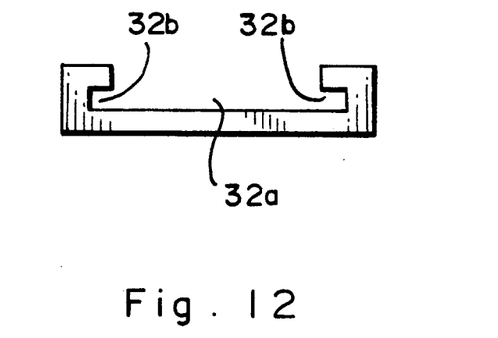
FIG. 12 is an end view of the guide rim of the lower material chamber shown in FIG. 3.

The slide damper 3A is constructed with a guide rim 31a which projects horizontally under the upper material storage chamber 31 provided above the charge tank 30 and another guide rim 32a which projects horizontally on the lower material chamber 32, and a control cover 6 having an opening 6a with rounded cutting edges provided between those two guide rims 31a and 32a so as to be movable back and forth. The control cover 6 is caused to slide by a driving means such as an air cylinder (not illustrated) and controls the insertion of solid materials stored in the upper material chamber 31 into the charge tank 30. A cutout 31b is formed at the guide rim 31a of the upper material chamber 31 so as to reduce frictional resistance caused by a sliding operation of the the cover 6 of slide damper. Recesses 32b (see also FIG. 12) formed at sides of guide rim 32a on the lower material chamber 32 are adapted to be used as a guide of cover 6 in case of reciprocating operation.

As shown in FIG. 4, a capacitance material level check sensor S1 is provided at the outer wall of charge tank 30 of the airtight transport tank 3 and also a capacitance material level check sensor S2 is provided at the upper outer wall of the upper material chamber 31. The sensor S1 disposed at the charge tank 30 enables the cover 6 of the slide damper to move to open and enables solid materials to be supplied from the upper chamber 31 by sending a material supply signal when a material storage level becomes lower than a predetermined detection level. And the sensor S2 provided at the upper chamber 31 stops the supply of medical tablets from the tablet molding machine 1 when a material storage level exceeds over a predetermined detection level on account of abnormal conditions during transportation control. A numeral S3 indicates a sensor provided at the lower horizontal pipe 41 connected to the discharge port of charge tank 30 to detect that materials of a manufacturing lot come to an end.

The upper and the lower material storage chambers 31 and 32 of airtight transport tank 3 are provided with an inclined guide plate 4A and a partition 5A respectively in order to prevent solid materials from being pinched by the control cover 6 of the slide damper in the case of opening and closing operations. As shown in FIG. 4, the inclined guide plate 4A and the partition 5A are provided above and below the control cover 6 in a line so as to form spaces SP1 and SP2 between the cover 6 respectively, the spaces being formed large enough to allow solid materials to pass through. The inclined guide plate 4A is comprised of an upper tapered portion 4a to be attached with the inner wall of upper material chamber 31 so as to form a space SP3 therebetween in order not to obstruct the falling of materials stored in the chamber 31 and further provided with a vertical plate 4b extended downwardly out of the tapered portion 4a. The partition 5A is provided vertically aligned with the plate 4b of inclined guide plate 4A with spaces top and bottom thereof, longitudinally separating the lower material storage chamber 32 into a main chamber SP4 and a supplementary chamber SP5. The top space SP2 of partition is formed large enough to allow solid materials to pass through.

A gas feed pipe 71 led from a pressurized gas feeding means (not illustrated) is connected to the pipe 7 projecting out of the upstream end of the lower horizontal pipe 41 of the transport pipe 4 in the opposite direction of material transportation, the pipe 7 being used as the housing portion 7 of the transport plug 9.

Because the plug 9 is constructed such that flexible bodies 92 and 92 are connected by a flexible connecting shaft 91 made of silicon, the plug 9 can pass through the transport pipe 4 smoothly even if the pipe 4 has curved portions or different calibers.

The transport plug 9 kept in the housing portion 7 is used to pneumatically transport residual materials in the pipe 4 into the collector 8 at the last stage of material transportation of a manufacturing lot. The residual materials are moved forward by pressurized gas fed from the gas feeding pipe 71 after releasing the lock of the plug 9 by replacing a stopper 10a which is projectably driven by air at the last transportation, as described hereinafter.

Next, the control operations of the slide damper 3A of the airtight transport tank 3 will be explained with reference to FIGS. 5 (a)-5 (d).

When the control cover 6 of the slide damper 3A is opened by receiving a material demand signal from the level sensor S1, the opening 6a of cover 6 is disposed over the main storage chamber SP4, as shown in FIG. 5 (a), and materials stored in the upper storage chamber 31 fall through the main chamber SP4 into the charge tank 30. Solid materials stored in the upper material chamber 31 are transferred in this way and fill the charge tank 30, then the slide damper 3A is closed by moving the cover 6 into a closing direction. In this embodiment, the closing operation of the cover 6 is controlled by a delay timer. However, a sensor which can detect the filling conditions of the solid materials in the charge tank 30 directly may be provided.

The opening 6a of the control cover 6 gradually shifts from over the main material storage chamber SP4 to over the supplementary chamber SP5 as the cover 6 of the slide damper moves in a closing direction. Therefore, solid materials in the upper material storage chamber 31 are guided from the main chamber SP4 to the supplementary chamber SP5 and fall into the chamber SP5 accompanying the movement of the opening 6a of the cover 6. Although the main chamber SP4 is almost filled with materials, the supplementary chamber SP5 is not filled. Materials fallen from the upper storage chamber 31 are received in the supplementary chamber SP5 from the space SP1 through the opening 6a of the cover 6. (FIG. 5(b)).

Also in this time, when the main chamber SP4 is already filled with solid materials, materials accumulated at the top thereof fall into the supplementary chamber SP5 through the space SP2 accompanying the movement of the cover 6. Consequently pinching of the materials with the cover 6 can be prevented. (refer to FIG. 5(c)).

Then the opening 6a of control cover 6 passes over the supplementary chamber SP5 and the projected end of the cover 6 is fully inserted into the recesses 32b of the guide rim 32a as the cover 6 further shifts in the closing direction, and falling of materials contained in the upper material storage chamber 31 is interrupted. If solid materials remain on the cover 6, they are contained in the space SP3 formed by the inclined guide plate 4A when the cover 6 is completely closed, thus pinching of materials with the cover 6 is prevented. (FIG. 5(d)).

In this way, the opening 6a of the control cover 6 shifts, finally hidden by the guide rim 32a. Consequently the slide damper 3A is completely closed and the charge tank 30 can be kept airtight.

When the charge tank 30 of the airtight transport tank 3 thus becomes airtight, the pressurized gas supplied from the pressurized gas feeding means (not illustrated) is intermittently fed into the charge tank 30 like an inching operation and solid materials stored in the tank 30 are successively discharged into the transport pipe 4 by the use of the thus caused internal pressure of the tank 30.

Simultaneously, according to the present system, solid materials continuously supplied from the tablet molding machine 1 are stored in the upper material storage chamber 31 to prepare for the next transportation.

Thus, solid materials stored in the tank 30 decrease with the successive pneumatic transportation, then the level sensor S1 sends a material demand signal. The slide damper 3A sets in the opening operation and the opening 6a moves through over the supplementary material storage chamber SP5 over the main chamber SP4 by shifting the control cover 6 in the opposite direction of the closing operation. With those movements of the cover 6, residual materials contained in the space SP3 made by the inclined guide plate 4A fall into the main chamber SP4. When the opening 6a of the control cover 6 is disposed over the main chamber SP4, materials fall into the charge tank 30 through the main chamber SP4, thus those procedures are repeated.

According to the invention, in such an airtight transport tank 3, materials aren't pinched by the control cover 6 during opening and closing operations of the cover 6 and materials remaining in the space SP3 of the upper chamber 31 interrupted by a closing operation of the cover 6 fall down into the charge tank 30 by gravity at the next opening operation of the cover 6. Therefore, the tank can be kept clean and its cleaning becomes easy because no materials remain in the tank 30.

Figure 6A:
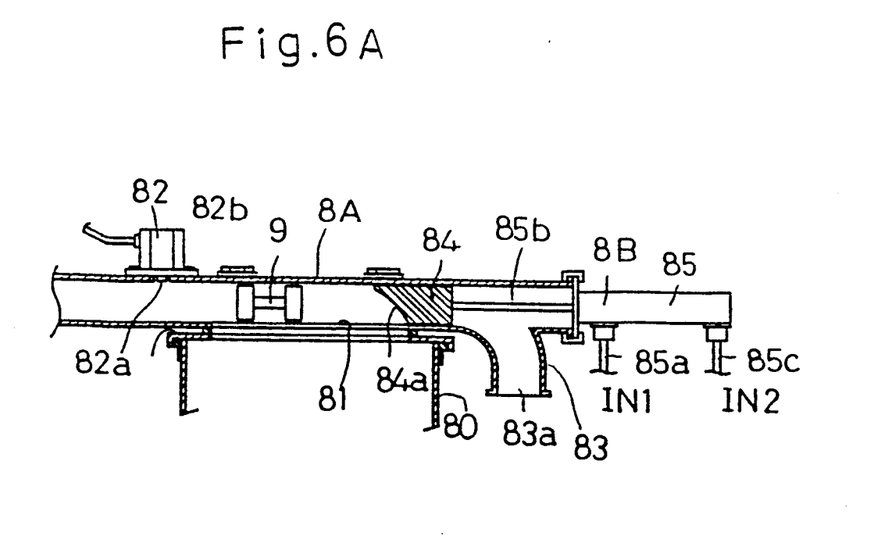
FIGS. 6A and 6B show detailed cross sectional constructions of the upper part of the collector.
Figure 6B:
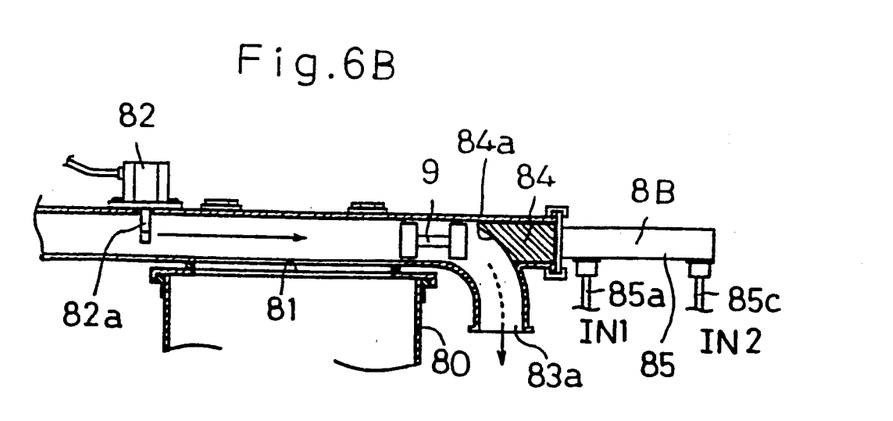

FIGS. 6A and 6B illustrate details of the upper part of collector 8.

The collector 8 is constructed with a receiving cylinder 8A provided above a storage tank 80 and provided to receive the transported plug 9 and materials, the cylinder 8A comprising a material falling port 81 to separate medical tablets from the transport plug 9 which are transported through the pipe 4 and a gas purge control means 82 to discharge the plug 9 to the outside by injecting gas.

The material falling port 81 is formed so as not to drop the plug 9 but to drop medical tablets. The gas purge means 82 is provided with a gas injection pipe 82a which is projectable out of a hole 82b disposed at the upstream end of the material falling port 81 of the receiving cylinder 8A. An elbow pipe 83 having an outlet 83a for the transport plug 9 is connected with the end of the receiving cylinder 8A. The opening and closing operations of the outlet 83a are controlled by reciprocating a stopper 84 by the use of a stopper shifting control means 8B.

The stopper control means 8B is constructed so as to be driven by an air cylinder 85. When pressurized air is fed from a first inlet IN1 connecting with an air injection pipe 85a of the air cylinder 85, a rod 85b is extended and the outlet 83a of plug 9 is closed by the stopper 84 provided at the leading end of rod 85b. On the other hand, when pressurized air is fed from a second inlet IN2 connecting with an air introduction pipe 85c of the air cylinder 85, the rod 85b is shortened to cause the outlet 83a to open.

With the collector 8, when the stopper 84 of the stopper control means 8B is extended so as to close the plug outlet 83a as shown in FIG. 6A and the gas injection pipe 82a of the gas purge control means 82 is kept in line with the upper wall of the receiving cylinder 8A in the case of pneumatically transporting solid materials, transported materials are not obstructed by the pipe 82a, are transported through the cylinder 8A, fall through the material falling port 81, and are finally collected in the storage tank 80. A curved surface 84a formed at the tip of the stopper 84 works as a shock absorber for solid materials.

Whereas, in the case of discharging the transport plug 9 in the cylinder 8A after residual materials are transported, the stopper 84 of the stopper control means 8B is retracted in order to open the outlet 83a and pressurized gas is injected from the gas injection pipe 82a of the gas purge control means 82 by projecting the pipe 82a into the receiving cylinder 8A, and the plug 9 is discharged to the outside. The plug 9 thus discharged is inserted again into the transport plug housing portion 7 provided below the airtight transport tank 3, transportation of the next lot being carried out continuously.

However, the system may be constructed such that the transported plug 9 returns to the housing portion 7 automatically in order to prepare for the next transportation.

Next, the operations of the present system will be described.

Medical tablets supplied from the material take-out port 1a are fed into the upper material storage chamber 31 from the material receiving port 3a provided at the top of the airtight transport tank 3 through the powder eliminator 2.

Thus a fixed amount of solid materials are stored in the upper chamber 31, then the slide damper 3A is opened to transfer those materials into the charge tank 30 so as to be stored therein. After the control cover 6 of the slide damper 3A is opened for a fixed time, the cover 6 is closed and the charge tank 30 of the airtight transport tank 3 is kept airtight. Under such conditions, pressurized gas is intermittently fed into the tank 30 like an inching operation through gas injection pipes 30b and 30b.

Consequently, materials stored in the charge tank 30 are successively transported into the lower horizontal pipe 41 filling the pipe 41 without clearance. Then they are transported into the vertical riser pipe 42 and gradually fill the pipe 42 from the bottom. When materials in the charge tank 30 are continuously supplied into the transport pipe 4, they are charged at high density to a degree just before blocking in the lower pipe 41 by acceleration with the convergent reducer 41a and moved upward in the vertical pipe 42 by intermittently feeding pressurized gas, thus filling the lower pipe 41 and the vertical pipe 42.

Solid materials thus transported into the vertical pipe 42 are decelerated by the divergent reducer 42a and then accelerated again by the accelerating convergent reducer 42b. The solid materials are then continuously transported upward without breaking off by receiving a sufficient pushing force from those reducers 42a and 42b. The reducers 42a and 42b provided at the vertical pipe 42 prevent breaking of solid materials in the pipe 42 and also effectively prevent up and down movements (irregular movement) of materials.

When materials reach the top of the vertical pipe 42, they are forcibly changed in their transporting direction into a horizontal direction by the bend pipe 44 and decelerated by the use of decelerating divergent reducer 43a provided at the upstream end of the pipe 43. Consequently, a series of materials is broken off and forms a long column P as shown in FIG. 8. The column P thus formed is pneumatically transported at a very low speed without clearance in the upper horizontal pipe 43. Accordingly, it doesn't happen that only surface materials of column P are transferred at first and the shape of the column is broken. Also materials are not damaged by mutual collisions in the upper horizontal pipe 43.

The column P of solid materials tends to be longer as the upper horizontal pipe 43 becomes longer. According to data derived by experimentation, the column length L was over about 1 m when the pipe 43 was 5 m, and it was over about 3 m when the pipe 43 was 20 m. The transportation speed of the solid materials could be reduced to about 0.1 m/sec.

Solid materials transported in the form of long column P at a low speed in the upper horizontal pipe 43 are received in the charge tank 80 of the collector 8 substantially under the effect of gravitational fall, thus completing pneumatic transportation. As is apparent from the above, materials are almost free from breakage according to the present system because they are collected substantially under the effect of gravitational fall.

Medical tablets continuously supplied from the tablet molding machine 1 are fed through the airtight transport tank 3 into the transport pipe 4 and collected into the collector 8 by repeating the above-mentioned procedures. When medical tablets come to the end of a manufacturing lot, the sensor S3 detects the reduction of materials and causes the stopper control means 10 of the transport plug 9 to become activated. Then the transport plug 9 carries residual materials in the pipe 4 into the collector 8 by the use of pressurized gas fed from the gas injection pipe 71 provided at the upstream end of the pipe 4.

According to the above-mentioned system, a preferable length and caliber of the reducer are determined depending on the solid materials to be transported. Considering the transportation of medical tablets, tablets are usually different in their grain size and grain figure within a fixed range. Therefore, it is strongly desired to absorb those differences within a normally expected range.

Figure 9:
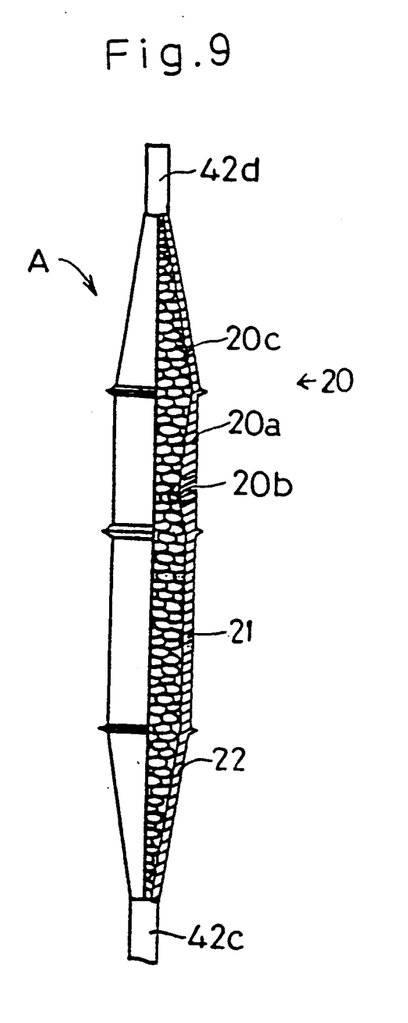
FIG. 9 is an enlarged vertical sectional view of an acceleration control reducer.

FIG. 9 shows an enlarged cross sectional view of an acceleration control reducer A which can effectively absorb the variation of grain size and grain figure of solid materials to be transported and can solve the above-mentioned problems.

Such an acceleration control reducer A is provided at the vertical riser pipe 42 of the transport pipe 4 instead of the foregoing pair of divergent and convergent reducers 42a and 42b. A convergent reducer 20 is constructed such that a convergent portion 20c is provided on a cylindrical main body 20a having a constricted portion 20b at the bottom thereof, connected to a divergent reducer 22 interposed by a straight pipe 21 as shown in FIG. 9.

When the reducer A thus constructed is incorporated into the vertical riser pipe 42, it is preferable to have an appropriate length. Lack of a pushing force caused when solid materials are accelerated by the acceleration convergent reducer 20 after deceleration by the divergent reducer 22 in the course of the rising up movement in the vertical pipe 42 of the transport pipe 4 is effectively compensated by the constricted portion 20b at the bottom of the convergent reducer 20. Accordingly, solid materials can be transported upward at high density without being broken off and without requiring adjustment of the pressure of the pressurized gas when solid materials are different in grain size.

Figure 10:
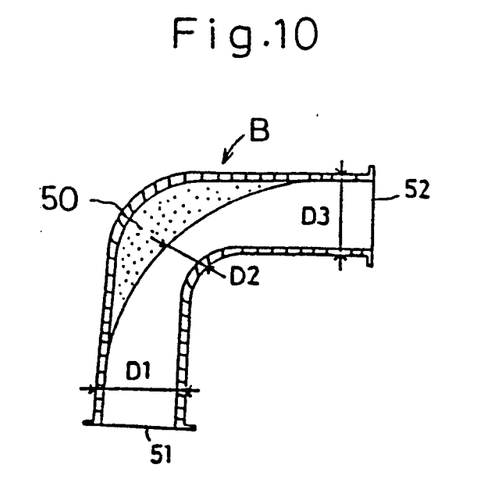
FIGS. 10 and 11 show a vertical sectional view of the bend pipe.

FIG. 10 illustrates a bend pipe B used so as to form a column of solid materials more stably.

The bend pipe B is used to connect the vertical riser pipe 42 and the upper horizontal pipe 43 instead of the foregoing normal bend pipe 44.

The bend pipe B is made of a straight pipe having the same caliber throughout the pipe and attached with a supplementary wall material 50 in the upper internal wall of the corner thereof so as to form a gently curved surface corresponding to the figure of the curb of the pipe. And a distance D2 between the upper and lower walls at the center of a corner of the bend pipe B is made smaller than D1 and D3 which are distances of the upper and lower walls at an inlet 51 and an outlet 52, respectively. A shock absorbing material is preferably used as the supplementary wall material 50 in order not to produce an impact on the solid materials, but supplementary materials which are made of the same material as the bend pipe B can be attached directly therein.

According to the transport pipe 4 incorporated with such a bend pipe B, solid materials are accelerated because the caliber of the pipe is gradually narrowed from the inlet 51 to the center of the corner and they are decelerated and diffused because the caliber from the center to the outlet 52 is gradually enlarged. As a result, solid materials fed into the bend pipe B are kept at a high density from the inlet to the center of the pipe B, then decelerated and diffused by the enlarged outlet 52 to form a long column P.

Figure 11:
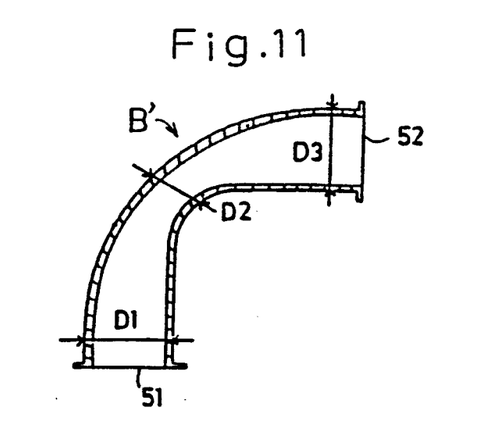

A bend pipe B' shown in FIG. 11 works the same as the one shown in FIG. 10, formed like a horn having a caliber D2 at the center of a corner smaller than calibers D1 of the inlet and D3 of the outlet.

The configuration of the caliber of such bend pipes B and B' isn't limited to a circle, but any configuration can be applied if the internal surface is smooth and even.

According to the pneumatic transport system of the present invention, the following characteristics and effects are expected.

As a charge tank of an airtight transport tank is provided under a material storage chamber having a slide damper to store solid materials, solid materials continuously supplied from a compression molding machine are stored in the material storage chamber and simultaneously materials which have been already stored in the charge tank are transported pneumatically by feeding pressurized gas intermittently into the charge tank. Therefore, materials can be supplied continuously, and as a result, the system can be also made smaller because the charge tank can be designed smaller.

As the capacity of the airtight transport tank can be made small compared to that of the tank used for a conventional pneumatic transportation system, residual pressure, when material supply stops, is reduced. Therefore, when material supply is discontinued halfway, there is no fear of breakage of solid material caused by blowout phenomenon.

As materials are transported by feeding pressurized gas intermittently into the airtight tank, control procedures to adjust the pressure of the gas can be facilitated.

What is claimed is:

1. A high density pneumatic transport system for pneumatically transporting slid materials, said system comprising:
   (a) a transport pipe;
   (b) an airtight transport tank comprising:
      an upper material storage chamber for storing solid materials supplied from a solid material manufacturing means;
      a guide plate comprising a tapered upper portion and a vertical portion, said tapered upper portion being attached with the inner wall of said upper material storage chamber and said vertical portion extending from an end of said upper portion with space, at the bottom thereof, which is large enough to allow solid materials to pass therethrough;
      a slide damper connected under said upper material storage chamber, said slide damper controlling the discharge of solid materials stored in said upper material storage chamber;
      a lower material storage chamber connected under said slide damper;
      a vertical partition provided in said lower material storage chamber with space, at the top thereof, which is large enough to allow solid materials to pass therethrough and also with space at the bottom thereof; and
      a charge tank connected under said lower material storage chamber and provided with pressurized gas introduction pipes for taking materials out of the tank into said transport pipe;
   (c) said transport pipe connected under said airtight transport tank comprising:
      a lower horizontal pipe including accelerating means;
      a vertical riser pipe connected with said lower horizontal pipe, said vertical pipe including decelerating means and accelerating means vertically arranged in the direction of material transportation; and
      an upper horizontal pipe connected with said vertical riser pipe, said upper horizontal pipe including decelerating means at the upstream end thereof; and
   (d) a collector connected with the terminal end of said upper horizontal pipe for receiving the transported materials,
      whereby solid materials fed into said charge tank by opening said slide damper of said airtight transport tank are supplied into said transport pipe by feeding a pressurized gas intermittently into said charge tank, pushed forward at high density through said lower pipe and said vertical pipe, then decelerated by said decelerating means provided at the upstream end of said upper horizontal pipe so as to form a long column and finally collected into said collector under substantially gravitational fall.

2. A high density pneumatic transport system for pneumatically transporting solid materials according to claim 1, wherein said charge tank includes a transport plug housing portion provided under said charge tank and connected with said transport pipe, said transport plug housing portion having a transport plug for transporting residual materials in said transport pipe into said collector by the use of pressurized gas.

* * * * *

UNITED STATES PATENT AND TRADEMARK OFFICE
CERTIFICATE OF CORRECTION

PATENT NO. : 5,150,990
DATED : September 29, 1992
INVENTOR(S) : Kiyoshi Morimoto et al It is certified that error appears in the above-identified patent and that said Letters Patent is hereby corrected as shown below:

Claim 1, column 11, line 33, "slid" should be "solid".

Signed and Sealed this

Fifth Day of October, 1993

Attest:

BRUCE LEHMAN

*Attesting Officer*          Commissioner of Patents and Trademarks